United States Patent [19]

Farr et al.

[11] Patent Number: 4,775,193
[45] Date of Patent: Oct. 4, 1988

[54] HYDRAULIC ANTI-SKID BRAKING SYSTEMS FOR VEHICLES

[75] Inventors: Glyn P. R. Farr, Warwickshire; John P. Bayliss, Worcestershire; Philip W. Sheriff, Warwickshire, all of England

[73] Assignee: Lucas Industries Public Limited Company, England

[21] Appl. No.: 35,897

[22] Filed: Apr. 6, 1987

[30] Foreign Application Priority Data

Apr. 12, 1986 [GB] United Kingdom ............... 8608959

[51] Int. Cl.⁴ .................................................. B60T 8/26
[52] U.S. Cl. ...................................... 303/9.75; 303/72
[58] Field of Search ..................... 188/181 A, 349; 303/6 C, 72, 113, 115

[56] References Cited

U.S. PATENT DOCUMENTS 3,552,802  1/1971  Packer et al. ................... 303/72 X Primary Examiner—Duane A. Reger
Attorney, Agent, or Firm—Laff, Whitesel, Conte & Saret

[57] ABSTRACT

In an hydraulic anti-skid braking system for a vehicle of the four wheel type in which an anti-skid modulator is adapted to control the brake on a rear wheel, an apportioning valve is incorporated in a line between each modulator and the brake, and a pressure-responsive control valve assembly is also incorporated in the line. The valve assembly comprises a pressure-responsive member, for example a piston working in a bore, and operable when subjected to a differential pressure in excess of a predetermined value, to restrict the effective area of passage through which fluid is dumped from the brake. This reduces the rate at which the pressure is released from the rear brake, thereby enabling this brake to do more work. Hence the stopping distance for the vehicle can be shortened.

11 Claims, 3 Drawing Sheets

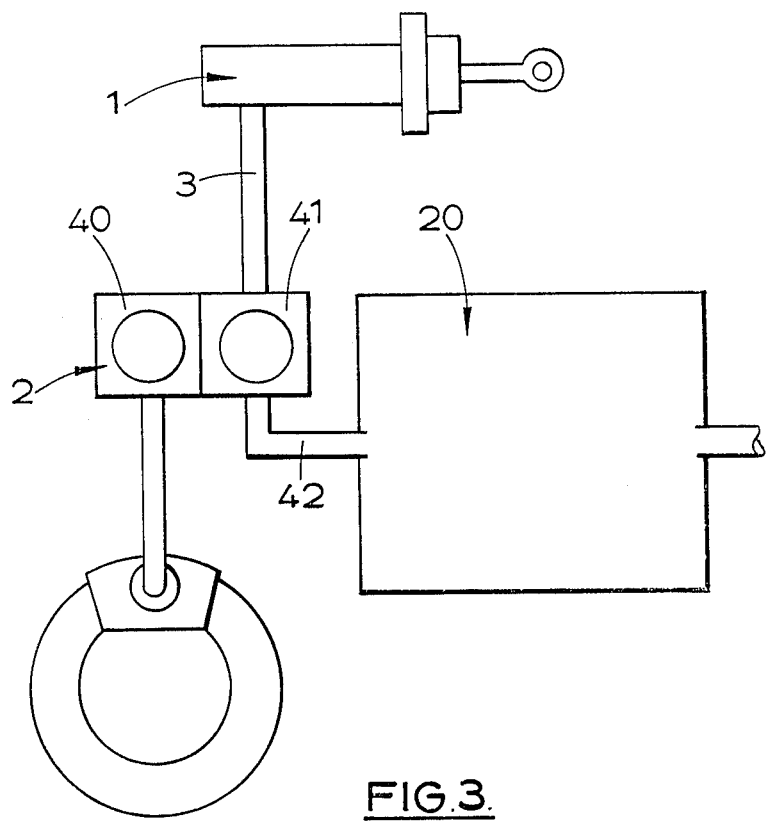
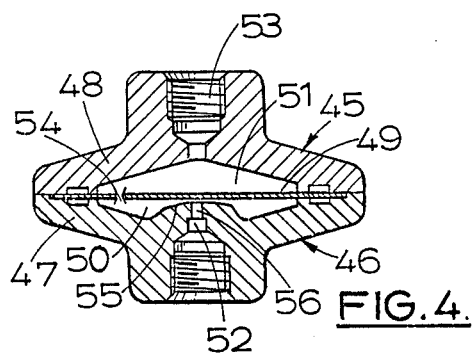
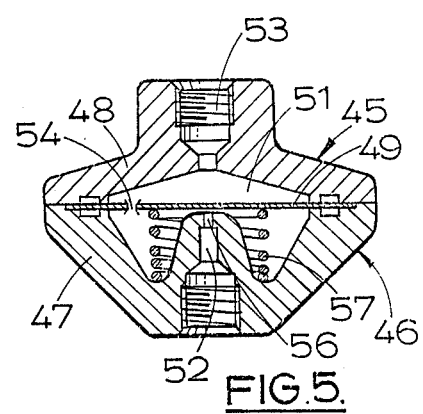
FIG.3.
FIG.4.
FIG.5.

HYDRAULIC ANTI-SKID BRAKING SYSTEMS FOR VEHICLES

This invention relates to an hydraulic anti-skid braking system for vehicles of the four wheel type provided with a brake on each wheel, the system being of the kind in which an anti-skid modulator is adapted to modulate the supply of brake-applying fluid to a brake on at least one wheel.

In some known systems of the kind set forth only the front wheel brakes are controlled directly by the modulators, and the rear wheel brakes respond to pressure levels determined by the modulator on the associated front wheel. In addition the pressure applied to the rear wheel brakes are also modified by apportioning valves which ensure that the front wheels will tend to lock before the rear wheels for all surface conditions.

To ensure that the front wheels do in fact lock before the rear wheels, the apportioning valves are set to under utilise the brakes on the rear wheels. Therefore, when a skid signal from a front wheel is received at a skid point, the pressure applied to the rear wheel brake is removed even though the risk of that wheel locking is remote. This occurs particularly when the vehicle is travelling over a surface of relatively low $\mu$ and a minimum transfer of weight takes place to the front wheels from the rear wheels.

Each anti-skid modulator incorporates a dump valve which, in response to a skid signal, reduces the pressure applied to the brake. Unless the modulator incorporates means for controlling the rate at which fluid is released from the brake, the rate of release will be uncontrollable with the result that the pressure will be reduced to an unnecessarily low value, which in turn, will increase the time interval before the brake can be re-applied. Again, therefore, the brake, which may be either a front wheel brake or a rear wheel brake, will be underutilised.

According to our invention, in an hydraulic anti-skid braking system of the kind set forth a pressure-responsive control valve assembly is provided to control the rate at which fluid is released from a brake, and the valve assembly is provided with means for reducing to a slower rate the rate at which pressure is released from the brake in accordance with a reduction in pressure on one side of the control valve assembly.

Reducing the rate at which the pressure is released from the brake enables that brake to do more work. Hence the stopping distance for the vehicle can be shortened. This is particularly true of the brakes on the rear wheels.

Preferably the control valve assembly comprises a pressure-responsive member displaceable in a housing in response to a differential pressure in excess of a predetermined value to restrict the effective area of a passage through which fluid is dumped from the brake.

Conveniently a portion of the member co-operates with a part of the housing to define the passage, and opposite sides of the member are interconnected by a fixed orifice, the pressure drop across which determines a point at which the member is adapted to move in the housing to restrict the effective area of the said passage.

The pressure-responsive member may comprise a slidable member, suitably a piston or a spool, working in a bore in the housing and movable against the loading in a spring and away from a stop to restrict the effective area of the passage.

When the member comprises a piston the piston may carry a valve head for co-operation with a seating in the housing in order, partially, to close the valve assembly, and the piston hovers in such a position to define a variable orifice which reduces the release of fluid from the brake substantially at a controlled constant rate.

When the member comprises a spool it may be combined in a common assembly with an existing flow-control valve which is provided for controlling the rate of brake re-application in a controlled manner following correction of a wheel lock and which incorporates a flow-control member.

In one construction the spool surrounds the flow-control member and an edge of an annular passage in the spool co-operates with a radial port in the housing to define a variable orifice which reduces the release of fluid from the brake substantially at a controlled constant rate.

In another construction the spool is arranged in series with the flow-control member, and the edge of the end of the spool remote from the flow-control member co-operates with a radial port in the housing to define a variable orifice which reduces the release of fluid from the brake substantially at a controlled rate.

In another construction the pressure-responsive member may comprise a flexible diaphragm which is sealingly carried at its outer peripheral edge from the housing and defines a valve member adapted to co-operate with a seating in the housing to provide a substantially constant rate of fluid release from the brake as determined by the pressure differential across the fixed orifice.

The diaphragm may be urged relatively away from the seating by a spring in order to control more accurately the resilience of the diaphragm.

Preferably the diaphragm comprises a metal plate in the form of a shim.

In the construction described above when the control valve assembly is disposed between an anti-skid modulator for a front wheel brake and a rear wheel brake an apportioning valve may be incorporated in the line between the modulator and the rear wheel brake, either upstream or downstream of the control valve assembly.

Some embodiments of our invention are illustrated in the accompanying drawings in which:

FIG. 3 is a portion of the layout of FIG. 1 but showing a modification;

FIG. 4 is a section through another control valve assembly;

FIG. 5 is a section similar to FIG. 4 but showing a modified control valve assembly,;

Figure 1:
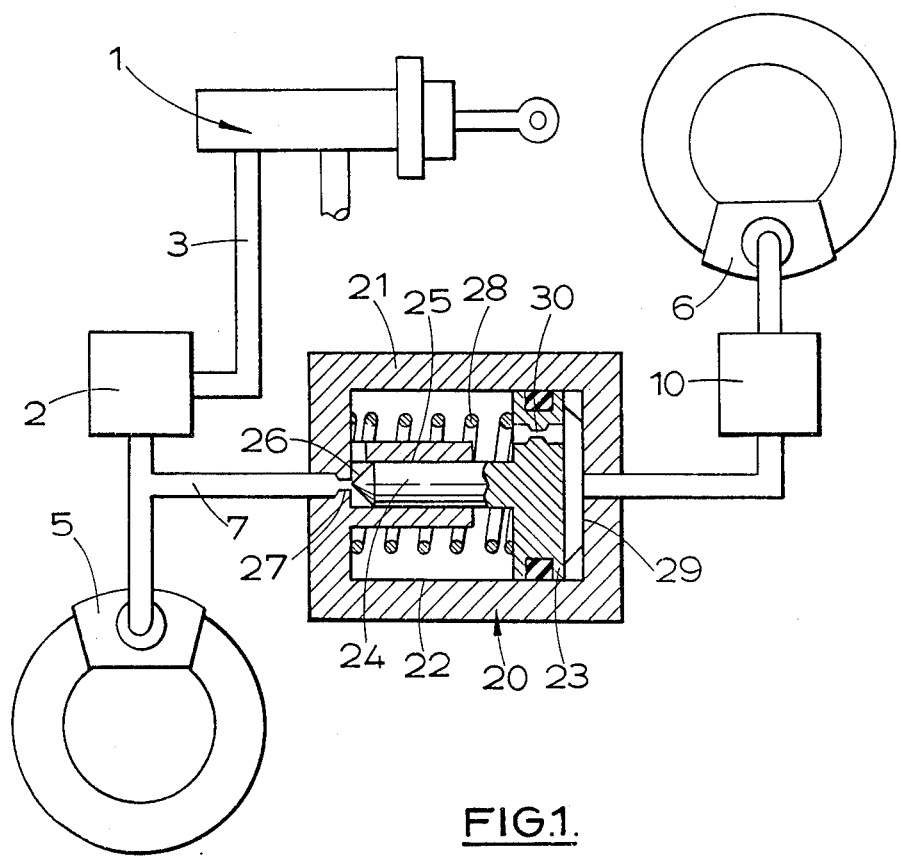
FIG. 1 is a layout of one circuit of an anti-skid hydraulic braking system of the twin-circuit X-split type for a four wheel vehicle.

The braking system illustrated in the layout of FIG. 1 comprise two separate hydraulic brake-applying circuits for a vehicle of a front wheel drive type having two front wheels and two rear wheels.

Only one of the two brake-applying circuits is illustrated since the two circuits are identical.

As illustrated in the drawings a pedal-operated master cylinder 1 has two pressure spaces, each for supplying one of the circuits.

One pressure space is connected to a brake-pressure modulator 2 of the two-channel type through a pipe-line 3 and the modulator 2, in turn, is connected to a brake 5 on the left-hand front wheel and to a brake 6 on the diagonally opposite right-hand rear wheel through a common pipe-line 7. The modulator 2 is driven through a drive from the left-hand front wheel.

This comprises one of the two brake-applying circuits.

The modulator 2 may conveniently be of the kind forming the subject of our G.B. Patent Application No. 8405903, or our G.B. Patent Application No. 8416991 or of similar construction to G.B. Pat. No. 8516991, in which the skid sensing means comprises a flywheel mechanism also driven through the respective drive.

A brake-applying apportioning valve 10 is positioned in the pipe-line 7 between the modulator 2 and the brake 6. The valve 10 is incorporated to ensure that the left hand front wheel will lock before the right-hand rear wheel, for given co-efficients of friction of the linings.

The behaviour of the front wheels namely deceleration and/or slip, is sensed by sensing means in the modulators which emit skid signals, suitably flywheel mechanisms, and the skid signals are operative to operate dump valves in the modulators in order to relieve the pressure of fluid supplied to the brakes.

Each modulator incorporates an hydraulic pump driven by the respective drive to achieve brake re-application following correction of a skid. The pump operates as described in G.B. Pat. No. 8416991, preferably in conjunction with flow-control regulator valve to control the rate of brake re-application, with the pump being stangled to give a constant output above a predetermined speed of rotation of the wheel. The pump can only generate a re-application pressure up to a value at which an immediately preceding front wheel lock occurred because the wheel itself is locked, and the pump is driven from the wheel.

A pressure-responsive control valve assembly 20 is located in the line 7, between the modulator 2 and the apportioning valve 10. The valve assembly 20 comprises a housing 21 having a longitudinally extending bore 22 in which works a piston 23, and the piston 23 is provided with an axially extending rod 24 has a coned head 26 adapted to co-operate with a seating 27 in the adjacent end of the housing and leading to the modulator 2.

A compression return spring 28 acts between the piston 23 and the housing 21, normally to urge the piston 23 into an advanced position in engagement with a stop 29 defined by a face at the opposite end of the housing. In this position the valve assembly 20 is fully open with the head 26 spaced from the seating 27.

A fixed restrictor comprising a restricted passage 30 in the piston 23 interconnects opposite ends of the bore and provides communication between the modulator 2 and the brake 6.

When the master cylinder 1 is operated to apply the brakes of both circuits, in the circuit illustrated in FIG. 1, fluid flows to the left-hand front brake 5 through the modulator 2, and through the open control valve assembly 20 to the apportioning valve 10 and the right-hand rear brake 6. When the brakes are applied the restrictor 30 offers substantially little resistance to flow, being typically 1.00 mm diameter.

Should the modulator 2 relieve the pressure applied to the front brake 5, when subjected to a predetermined pressure drop across the restrictor 30 of say 2 bar, the piston 23 is subjected to a differential pressure which causes it to move relatively away from the stop face 29 against the force in the compression spring 28 and towards the valve seating 27. Thus the head 26 partially closes the cone valve. The piston 23 hovers in this position to define a variable orifice, thus releasing the brake 6 substantially at a constant controlled rate.

Figure 2:
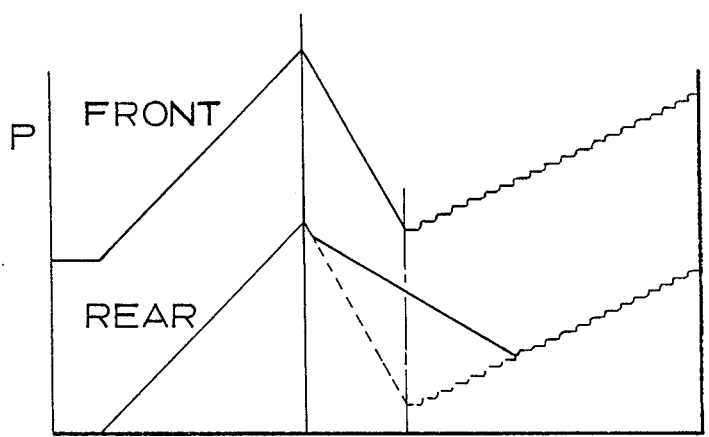
FIG. 2 is a graph of brake-pressure plotted against time for the brakes on the front wheel and the diagonally opposite rear wheel of the system illustrated in FIG. 1.

The graph illustrated in FIG. 2 illustrates in full lines a comparison between the behaviour of the front and rear brake in use. The dotted lines of the lower graph show how the pressure of the rear brake 6 would have fallen if the valve assembly 20 had not been included.

In a modification the valve assembly 20 may be incorporated between the apportioning valve 10 and the brake 6.

In the portion of the braking system illustrated in FIG. 3 of the accompanying drawings the modulator 2 is of the solenoid-operated 4-channel type in which the brakes on the four wheels of the vehicle are controlled independently of each other by solenoid-operated valves in response to signals from electrical speed sensors, of which one sensor is associated with each wheel. The signals from the sensors are fed into a control module which emits a corresponding electrical current to energise the solenoid of a respective one of the solenoid-operated valves.

In FIG. 3 of the drawings front and rear channels 40, 41 of one-half of the modulator 2 are illustrated and it will be noted that the supply of fluid to the front wheel brake 5 is modulated by the channel 40 and that to a pipe-line 42 leading to the valve assembly 20 and a corresponding rear brake is modulated by the channel 41.

When the channel 41 relieves the pressure applied to the rear brake, the release of fluid again follows the lower graph of FIG. 2, but this is independent of the behaviour of the three other wheels of the vehicle.

The control valve assembly 20 of FIGS. 1 and 3 may be replaced by a control valve assembly 45 illustrated in FIG. 4 of the drawings. As shown in FIG. 4 the control valve assembly 45 comprises a housing 46 constructed from first and second parts 47, 48 which are clamped together with mating faces in engagement, and a flexible diaphragm 49 of which the peripheral edge is clamped between the mating faces of the two parts defines a space between the two parts into first and second chambers 50, 51. The chamber 50 is connected to the modulator 20 and the master cylinder 1 through an axial connection 52 in the housing part 47, and the chamber 51 is connected to the rear brake 6 through a connection 53 in the housing part 48.

The diaphragm 49 comprises a shim, suitably of steel, provided with a fixed restrictor comprising an orifice 54, and a region of the diaphragm, substantially at its geometric centre, co-operates with a seating 55 surrounding a port 56 at the inner end of the axial connection 52.

Normally the diaphragm is spaced from the seating 55. As in the valve assembly 20 described above, when the rear brake 6 is applied the orifice 54 offers little resistance to flow.

When the modulator relieves the pressure applied to the rear brake 6, and the said predetermined pressure drop occurs across the orifice 54, the diaphragm 49 is subjected to a differential pressure which causes it to flex and deflect resiliently towards the seating 55 with which it co-operates to define a variable orifice which is operative to release the brake 6 substantially at a constant controlled rate.

Normally the inherent resilience of the material of the diaphragm 49 will enable the parameters of the valve assembly 45 to be adequately controlled. However, as shown in FIG. 5 of the accompanying drawings a compression spring 57 is incorporated normally to urge the diaphragm 49 relatively away from the seating 55 and to control more accurately the resilience of the plate 49.

Figure 6:
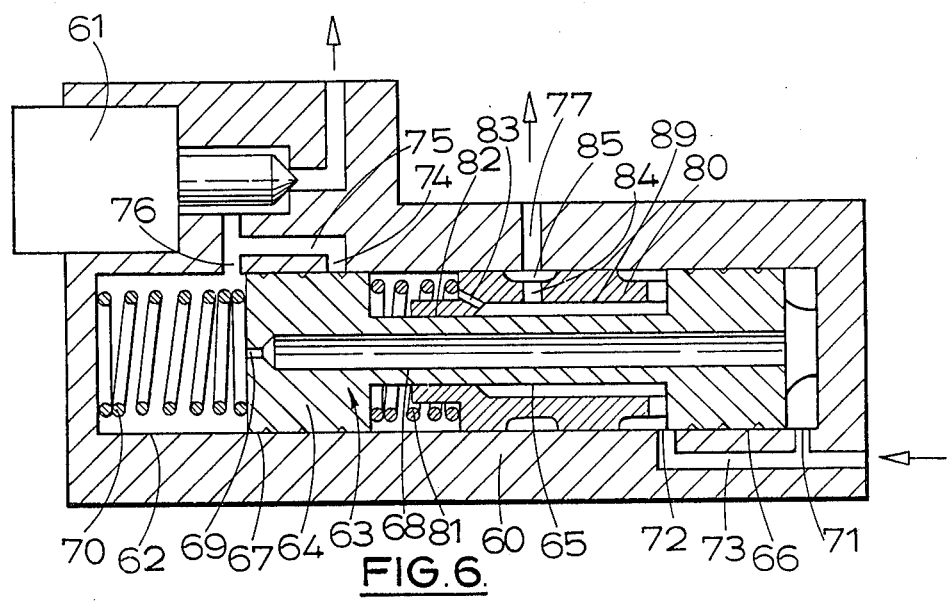
FIG. 6 is a longitudinal section through another control valve assembly.

The valve assembly illustrated in FIG. 6 of the drawings is integrated into anti-lock modulator conveniently of the kind following the subject of G.B. Pat. No. 8512610 and may be used for modulating the supply of fluid to a front wheel brake, or to a rear wheel brake. In the construction shown in FIG. 6 the modulator comprises a housing 60 incorporating a solenoid-operated dump valve 61 responsive to signals from a wheel speed sensor and which is normally closed to isolate a longitudinal bore 62 in the housing from an expander chamber (not shown) to which fluid is dumped from the brake 6 when the solenoid of the dump valve 61 is energised. The housing incorporates a flow-control regulator valve 63 comprising a first spool 64 working in the bore 62. The spool 64 is provided at opposite ends of a radial groove 65 with axially spaced lands 66, 67. The spool 64 has a longitudinal bore 68 which terminates at its inner end adjacent to the dump valve 61 in a restricted orifice 69. A spring 70 acts on the inner end of the spool 64 normally to urge it into a first position in engagement with the opposite, outer end of the bore 62. In this position the first land 66 is positioned between a first port 71 and a second port 72 both connected to the remote cylinder through a longitudinal passage 73, and the second land 67 closes a third port 74 connecting with a passage 75 leading to the dump valve 61, but is spaced from a fourth port 76 also communicating with the passage 75. Irrespective of the position of the spool 64 in the bore 62 the groove 65 will always lie in free connection with a port 77 in the housing 60 which is connected to the brake.

A second spool 80 also working in the bore 62 has a stepped internal bore 89 of which the portion 82 of smaller diameter which is adjacent to the land 67 has a sliding engagement with the base of the groove 65. Normally the second spool 80 is urged towards the land 66 by a compression spring 81.

A restricted passage 83 passing through the wall of the spool 80 substantially at the step in diameter defined a fixed orifice, and the spool has a radial port 84 leading at its outer end into an annular groove 85 with which the port 77 is in free communication when the second spool 80 is held in a retracted position by the spring 81 with the spool 80 engaging at a step in diameter between the land 66 and the base of the groove 65.

In the position shown in the drawings fluid from the master cylinder is applied to the brake through the passage 73, the port 72, the clearance between the second spool 80 and the spool 64, the radial port 84, the annular groove 85, and the port 77.

When the solenoid-operated valve is energised it moves into an open position. Fluid is released from the adjacent end of the bore 62 with the first spool 64 moving in a corresponding direction due to the pressure drop across the orifice 69. Initially this causes the land 66 to cover the inlet port 72, temporarily isolating the master cylinder from the brake. The spool 64 moves further in the same direction to connect the land 74 to the brake through the restricted passage 83, the passage 84, and the port 77. The spool 64 then moves even further until the leading edge of the land 67 almost closes the port 76. In this position fluid from the first port 71 flows, through the orifice 69, past the metered edge of the port 76 and thereafter to the expander chamber. At the same time the spool 80 moves across to meter fluid from the brake by partially closing the port 77, the flow rate being determined by the annular area of the spool 80, the spring 81, and the restricted passage 83.

Whilst the solenoid-operated valve 61 is open, the master cylinder continues to supply fluid to the brake but at a restricted ratio determined by the fixed orifice 69 and then by the seating of a variable orifices defined by the co-operation of the metering edge of the land 67 with the port 76, and as described in G.B. Pat. No. 8512610.

At the termination of the skid signal the valve 61 closes, and the flow-regulating valve 64 remains in its metering mode so that the pressure applied to the brake increases at a fixed rate and by operation of the pump as described in G.B. Pat. No. 8512610.

Figure 7:
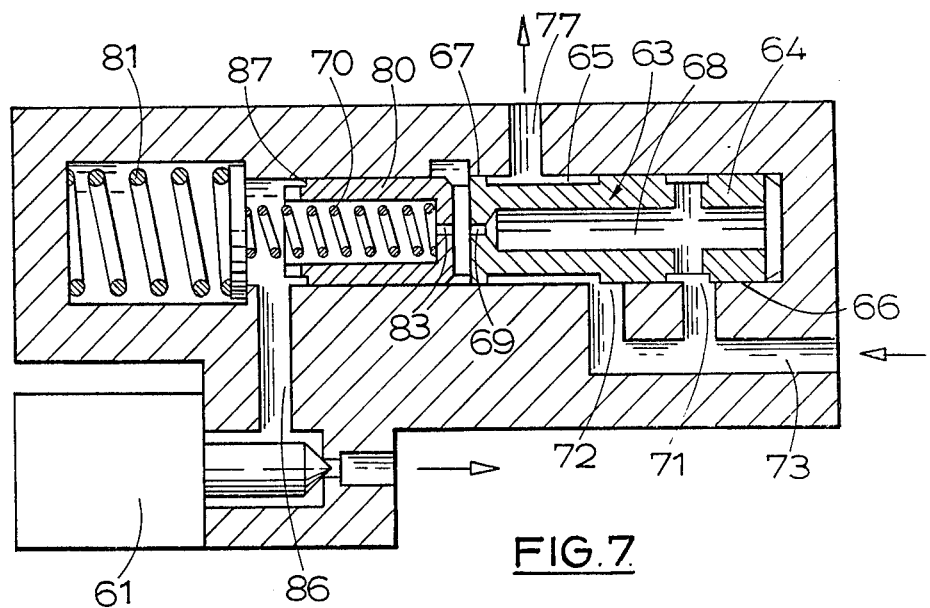
FIG. 7 is a longitudinal section through a control valve assembly similar to FIG. 6 but showing a modification.

In the modulator assembly illustrated in FIG. 7 the second spool 80 works in the bore 62 in series with the spool 64. The spool 80 comprises a thimble with the fixed orifice 83 provided in the closed end of the spool 80 which co-operates with the spool 64. The variable orifice is defined by the co-operation of an edge 87 at the opposite outer end of the second spool 80 with a radial passage 86 leading to the solenoid-operated valve 61.

In this construction, when the spool 80 moves to its metering position, the force of the spring 70 is removed from the spool 64 which isolates the master cylinder.

The construction and operation of the embodiment of FIG. 7 is otherwise the same as that of FIG. 6 and corresponding reference numerals have been applied to corresponding parts.

The control valve assemblies described above with reference to FIGS. 6 and 7 may be used to control the flow rate for both front and rear brakes, or a combination of both.

For example, when the system is of the two channel type illustrated in FIG. 1 of the drawings, the modulator 2 may also incorporate a flow control valve assembly. In such a layout, the rate at which fluid is released from the respective brakes is different. This is achieved by ensuring that the flow characteristics of the two valve assemblies are different.

Similarly, when a separate control valve assembly is provided for each front wheel brake, and a thrust control valve assembly is provided common to both rear wheel brakes, the flow characteristics of the valve assembly for the rear wheel brakes is different from the valve assemblies for the front wheel brakes.

We claim:

1. An anti-skid hydraulic braking system for a vehicle of the four wheel type provided with a brake on each wheel, comprising a source of brake-applying fluid, a modulator for modulating the supply of fluid from said source to at least one of said brakes, and a control valve assembly for controlling the rate at which fluid is released from said brake by said modulator, wherein said valve assembly is provided with reducing means for reducing the rate at which pressure is released from said brake in accordance with a reduction in pressure on one side of said control valve assembly, and passage means having an effective area which is variable to determine the rate at which fluid is dumped from said brake, said reducing means comprising a member responsive to a differential pressure in excess of a predetermined value to reduce said effective area of said passage means.

2. An anti-skid hydraulic braking for a vehicle of the four wheel type provided with a brake on each wheel, comprising a source of brake-applying fluid, a modulator for modulating the supply of fluid from said source to at least one of said brakes, and a control valve assembly for controlling the rate at which fluid is released from said brake by said modulator, wherein said valve assembly is provided with means for reducing the rate at which pressure is released from said brake in accordance with a reduction in pressure on one side of said control valve assembly, wherein said control valve assembly comprises a housing, a passage through which fluid is dumped from said brake, and a pressure-responsive member displaceable in said housing in response to a differential pressure in excess of a predetermined value to restrict the effective area of said passage.

3. A system according to claim 2, wherein said member has a portion adapted to co-operate with a part of said housing to define said passage, and opposite sides of said member are interconnected by a fixed orifice, the pressure drop across said fixed orifice determining a point of which said member is adapted to move in said housing to restrict said effective area of said passage.

4. A system according to claim 2, wherein said housing has a bore, and said pressure-responsive member comprises a slidable member working in said bore and movable against the loading in a spring and away from a stop to restrict the effective area of said passage.

5. A system according to claim 4, wherein said member comprises a piston carrying a valve head for co-operation with a seating in said housing in order, particularly, to close said valve assembly, and said piston is adapted to hover in such a position to define a variable orifice which reduces the release of fluid from said brake substantially at a controlled constant rate.

6. A system according to claim 2, wherein said pressure-responsive member comprises a spool combined in a common assembly with an existing flow-control valve for controlling the rate of brake re-application in a controlled manner following correction of a wheel lock and which incorporates a flow-control member.

7. A system according to claim 5, wherein said spool surrounds said flow-control member and an edge of an annular passage in said spool co-operates with a radial port in said housing to define a variable orifice which reduces the release of fluid from said brake substantially at a controlled constant rate.

8. A system according to claim 5, wherein said spool is arranged in series with the flow-control member, and the end of said spool remote from said flow-control member co-operates with a radial port in said housing to define a variable orifice which reduces the release of fluid from said brake substantially at a controlled constant rate.

9. A system according to claim 2 wherein said pressure-responsive member comprises a flexible diaphragm which is sealingly carried at its outer peripheral edge from said housing and defines a valve member adapted to co-operate with a seating in said housing to provide a substantially constant rate of fluid release from said brake as determined by a pressure differential across said fixed orifice.

10. A system according to claim 8, wherein said diaphragm is urged relatively away from the seating by a spring.

11. A system according to claim 8, wherein said brake is provided on a rear wheel of the vehicle, and an apportioning valve is incorporated in the line between said modulator and said rear wheel brake.

* * * * *